US011288272B2

(12) United States Patent
Lee et al.

(10) Patent No.: US 11,288,272 B2
(45) Date of Patent: Mar. 29, 2022

(54) QUERY CANCELATION USING A SIGNAL HANDLER THROWING AN EXCEPTION

(71) Applicant: SAP SE, Walldorf (DE)

(72) Inventors: Chae Kwang Lee, Seoul (KR); Juchang Lee, Seoul (KR); Jaeyoung Choi, Seoul (KR)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 16/406,945

(22) Filed: May 8, 2019

(65) Prior Publication Data

US 2020/0356555 A1    Nov. 12, 2020

(51) Int. Cl.
*G06F 7/00*     (2006.01)
*G06F 16/2455*  (2019.01)
*G06F 9/48*     (2006.01)

(52) U.S. Cl.
CPC .......... *G06F 16/2455* (2019.01); *G06F 9/485* (2013.01)

(58) Field of Classification Search
CPC .... G06F 16/2455; G06F 9/485; G06F 16/252; G06F 16/24553
USPC ................................ 707/705, 769, 770, 765
See application file for complete search history.

(56) References Cited

U.S. PATENT DOCUMENTS

2005/0203890 A1\* 9/2005 Chen ..................... G06F 16/252
2020/0081818 A1\* 3/2020 Bain ................... G06F 11/0715

\* cited by examiner

*Primary Examiner* — Md I Uddin
(74) *Attorney, Agent, or Firm* — Fountainhead Law Group P.C.

(57) ABSTRACT

In some embodiments, a method detects a cancelation of a query for an application that is running. The query is being performed on a database system. The method processes the cancellation to determine one or more threads associated with the query and sends a signal to the one or more threads that are associated with the process to suspend the one or more threads. One or more signal handlers for the one or more threads are called and an exception is thrown by the one or more signal handlers to cancel the query. The exception causes the query to be canceled.

16 Claims, 8 Drawing Sheets

QUERY CANCELATION USING A SIGNAL HANDLER THROWING AN EXCEPTION

BACKGROUND

An application may execute a query that accesses a database. Sometimes, the query may encounter problems, such as the query may be running for an abnormally long time, which may cause problems in the system. In response, an administrator or the application may issue a query cancel request that may cancel the query. To consume the query cancel request, multiple branches of software are required for checking for a query cancel flag when the query cancel request is received. This results in many branches in the software of the database system that are required to check for whether the query cancel flag has been issued. Even though the branches are included in the software of the database system, because it is possible that the query cancel flag may be missed or not applied intentionally, the query may not be cancelled.

Also, a subcomponent of the system may crash at certain times. When this crash occurs, the overall system may be shut down. For example, when a crash signal is received from a subcomponent of the system, the overall system may be shut down. This may hinder the performance of the overall system when the crash cannot be isolated to one subcomponent.

DETAILED DESCRIPTION

Described herein are techniques for a system that throws exceptions to perform actions. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments throw an exception to cancel a query that is currently being executed in a database system. When a query should be canceled, the system, such as an operating system kernel in the system, may call a signal handler that is associated with a process executing the query on the database system. A query canceller in the database system may process the query cancel request and determine one or more threads that are executing the query then send a signal to the target threads. The signal handler throws an exception to cancel the query, which causes the thread to cancel the query. The query may be canceled based on the thread receiving the exception. This avoids missing query cancel flags when an administrator or an application can issue a query cancel request, and also software code for the database system may become more compact by removing the branches that check for query cancel flags.

Also, in some embodiments, when a process that is running experiences a crash situation and a signal is raised, the system, such as the operating system kernel, receives the signal and causes the signal handler to process the crash situation. In response, the signal handler may suspend the thread that is executing the process. Then, the signal handler may perform a job based on the crash, such as gathering and saving information associated with the crash. After which, the signal handler throws an exception to roll back the transaction. Throwing the exception to roll back the transaction may allow the process to continue and also does not shut down the entire system, such as other processes that are executing, because of the crash. For example, the signal handler may cause the process to resume or exit, but the application may continue executing. For example, the signal handler may cause the process to exit if rolling back the transaction did not fix the crash or if the signal handler cannot recognize how to handle the crash. However, if rolling back the transaction or the signal handler can resolve the situation that caused the crash, then the signal handler may resume the execution of the process.

Accordingly, using the signal handler to throw the exception to roll back the transaction allows the system to continue to execute even though one process is experiencing a crash situation. Further, using the exception may allow the crash situation to be rectified while rolling back the transaction. However, even if the crash situation cannot be fixed, the process experiencing the crash situation may be exited while allowing the system to continue to execute.

System Overview

Figure 1:
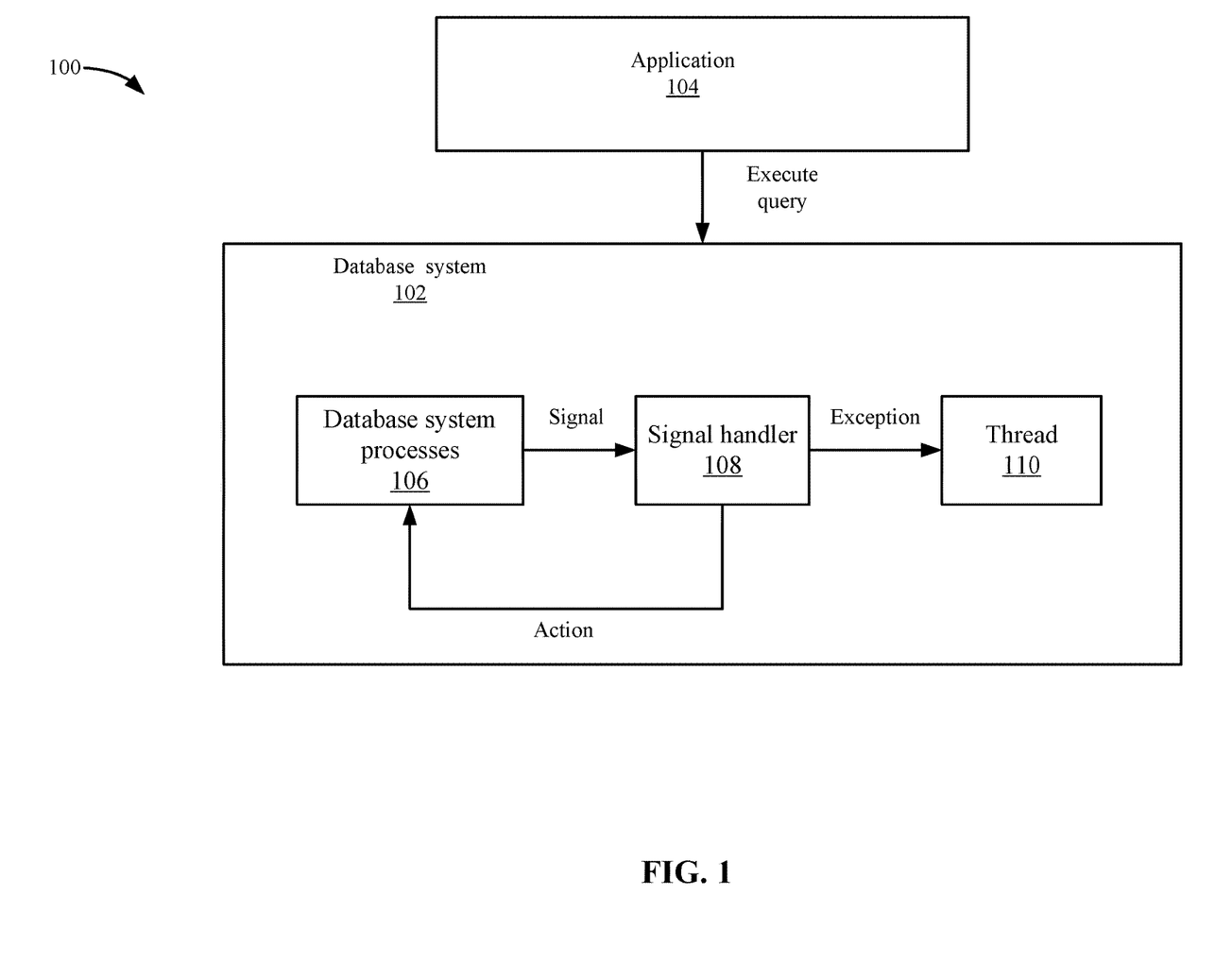
FIG. 1 depicts a simplified system for throwing exceptions to perform actions according to some embodiments.

FIG. 1 depicts a simplified system 100 for throwing exceptions to perform actions according to some embodiments. System 100 includes one or more computing devices that are executing a database system 102 and one or more applications 104. Application 104 may include one or more application processes that are requesting to execute a query. Database system 102 may include one or more database system processes 106 that are executing queries for application 104. In other embodiments, application 104 may be executing with database system process 106. Although a database system is described, other types of systems may be used.

A signal handler 108 is used to process signals from database system processes 106. For example, when certain events occur at database system processes 106, such as a query should be canceled or a crash occurs, signal handler 108 may receive a signal based on the event. In some embodiments, the signal may be received from an operating system kernel. In some embodiments, the signal may be a type of intraprocess communication or a type of interprocess communication (IPC) between database system processes 106, which may be an asynchronous notification that is sent to signal handler 108. However, other types of communication may be used. In some embodiments, signal handler 108 is registered by a specific database system process 106 as its signal handler. In other cases, signal handler 108 may be used a default signal handler. Different signal handlers may be installed for different signals.

Once receiving the signal, signal handler 108 may perform a job, such as checking whether the thread is executing a target query that is to be canceled or gathering and storing information for a crash. Then, signal handler 108 may throw an exception to have an action performed. For example, the exception may be a programming language exception, such as a C++ exception, that causes an action to be performed. In some examples, the exception causes a thread 110 to perform an action. For example, thread 110 may cancel a query in response to receiving the exception. In other embodiments, thread 110 may roll back a transaction that caused a crash in response to receiving the exception. For example, a database system can roll back an executed transaction from the start of the transaction.

Signal handler 108 may also perform an action with database system process 106, such as suspending database system process 106 when the signal is received in the case of a crash. Signal handler 108 may gather crash information and analyze it and then may cause database system process 106 to exit or resume processing. In the case of cancelling a query, signal handler 108 may confirm the cancelation of the query, for example, when signal handler 108 is executing in the target thread.

In some embodiments, database system 102 may use a "-fnon-call-exception" compile option that enables signal handler 108 to throw an exception when a signal is received. The exception allows trapping of instructions to throw exceptions. It also allows hardware signals generated by trapping instructions to be converted into exceptions using exception handling mechanisms. A trapping instruction may be known as a fault or exception. This may occur when an exceptional condition is encountered, such as a breakpoint, division by zero, invalid memory access, query cancel request, etc.

Signal handler 108 can catch the signal and throw an exception. For example, signals generated by trapping instructions can be caught by signal handler 108. Database system processes 106 may include the "-fnon-call-exception" compile option, which is compiled and allows the trapping of an instruction that is converted into the exception. The compile option makes exception-throwable code range expand.

Figure 2:
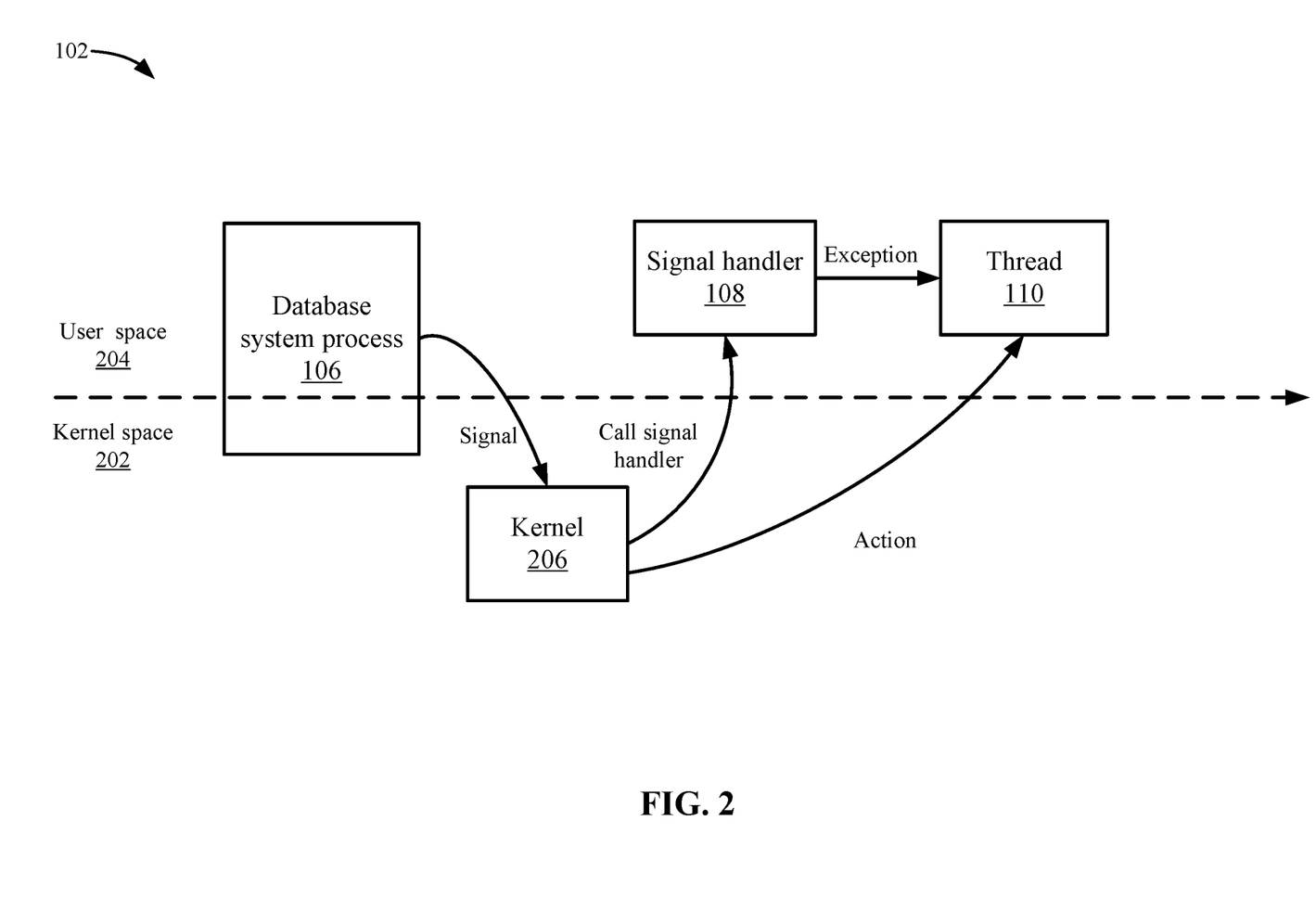
FIG. 2 depicts a more detailed example of throwing the exception according to some embodiments.

FIG. 2 depicts a more detailed example of throwing the exception according to some embodiments. A node of database system 102 includes a kernel space 202 and a user space 204. Kernel space 202 is where the kernel, such as the operating system, executes. User space 204 is where user processes, such as everything other than the kernel, run. Database system process 106 may be executing queries for application 104. Database system process 106 may be running in user space 204 or kernel space 202.

While database system process 106 is running, an event may occur. In some embodiments, the event may be a fault that may involve a crash. In other examples, the event may be a query cancellation. For example, database system 102 receives a query cancel request to cancel a query from an administrator.

Upon encountering the event, database system process 106 may generate a signal. In some examples, the signal is generated by database system process 106 or kernel 206. A signal can be generated by calling a C library function like pthread_kill( ). The database system calls the C library function to generate a signal to cancel a query that is running. In a crash situation, a kernel generates a signal when an action, such as an invalid memory access or divide by zero, and so on, is performed. Upon receiving the signal from database system process 106, kernel 206 calls signal handler 108 to process the signal.

Signal handlers 108 may be instantiated for each type of signal. For example, a signal may have an associated signal handler 108, such as the associated signal handler 108 may be installed by database system process 106 when the process is launched. Otherwise, a default signal handler may be used.

Once detecting the event, kernel 206 may also perform an action associated with database system process 106. For example, kernel 206 may suspend the execution of a thread. Also, signal handler 108 may suspend the execution of database system process 106.

Signal handler 108 receives a signal from kernel 206 and then can throw an exception in thread 110. A thread 110 that is executing in a database system process 106 receives (e.g., catches) the exception and can perform the action. Thread 110 may be suspended by kernel 206, but it can be resumed by calling signal handler 108 on the thread from kernel 206. In some examples, the action involves thread 110 canceling a specified query. In other examples, when a crash has occurred, the action may be thread 110 rolling back a transaction that is associated with the crash. The rolling back of the transaction may unwind instructions in the call stack of thread 110. The use of the exception allows the special handling of the event. Execution may be suspended to allow processing of the exception, but database system processes 106 may not be shut down. The throwing of the exception allows the transfer of control from a lower level function to an upper level function of the call stack in exception case of function.

Figure 3:
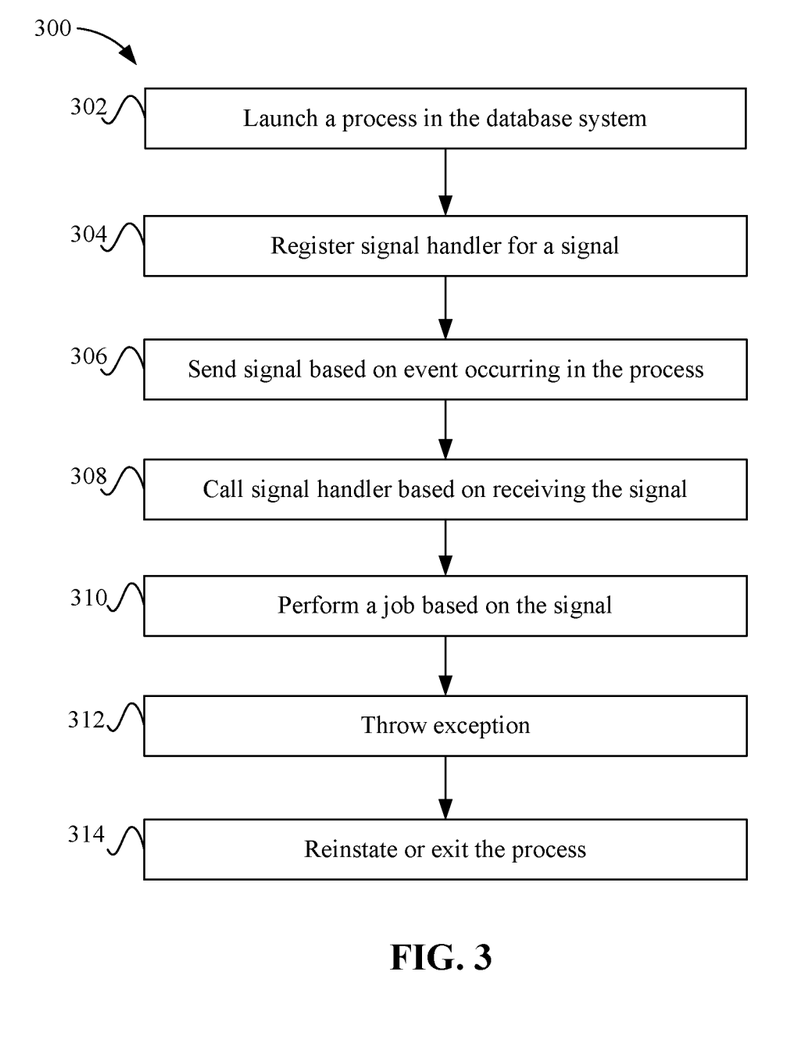
FIG. 3 depicts a simplified flowchart of a method for a process for throwing an exception according to some embodiments.

FIG. 3 depicts a simplified flowchart 300 of a method for a process for throwing an exception according to some embodiments. At 302, database system 102 launches an database system process 106. Then, at 304, database system process 106 registers a signal handler 108 for a signal.

When an event occurs, at 306, database system process 106 sends a signal based on the event occurring. The signal may indicate a fault has occurred or a query cancel request has been received.

At 308, signal handler 108 is called, such as by kernel 206, based on receiving the signal. At 310, signal handler 108 may perform a job based on the signal. For example, the job may be to gather information for the crash or information on the query being performed.

At 312, signal handler 108 throws an exception based on receiving the signal. The exception may cause some action to be performed, such as having thread 110 cancel the query. Additionally, the exception may cause a transaction to be rolled back, such as by unwinding execution of the transaction from a call stack that may have been causing the crash.

At 314, signal handler 108 may reinstate or exit the process. For example, if the query was cancelled successfully, signal handler 108 may indicate to kernel 206 that the query was cancelled. Signal handler 108 could also resume the execution of database system process 106. In the case of a crash, if the transaction was rolled back successfully, signal handler 108 may indicate that the transaction was rolled back successfully, and kernel 206 may reinstate or resume execution of database system process 106. If the rolling back of the transaction was not successful, signal handler 108 may indicate to kernel 206 of the unsuccessful transaction rollback, and kernel 206 may cause database system process 106 to exit.

Query Cancellation

Figure 4:
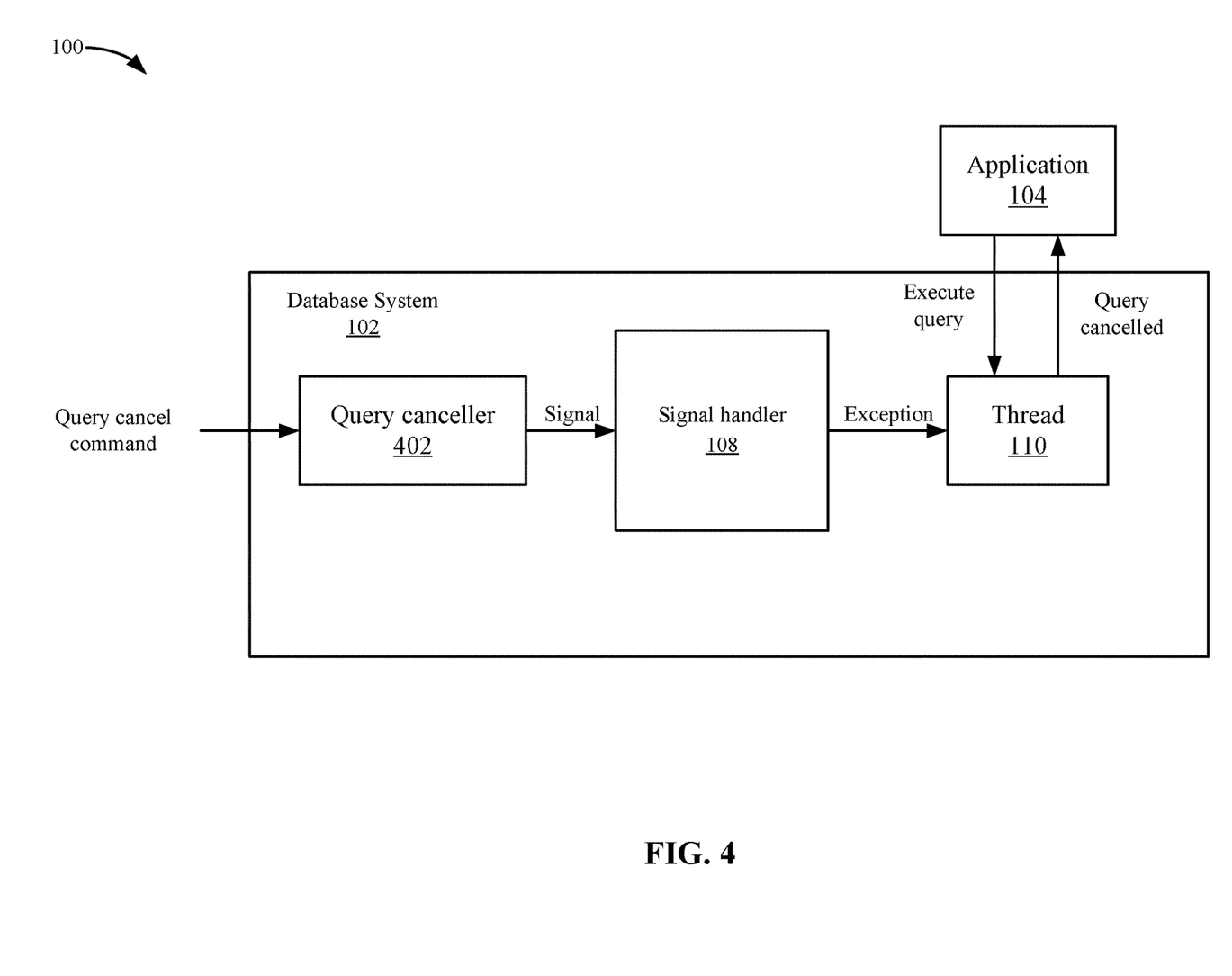
FIG. 4 depicts a more detailed example of the server system for performing query cancellation according to some embodiments.

FIG. 4 depicts a more detailed example of system 100 for performing query cancellation according to some embodiments. A query canceller 402 may receive a query cancel command, such as from an administrator that wants to cancel a query that is being run. For example, the administrator may have observed that a query has been running for an abnormally long period of time or just wants to cancel the query for some other reason. Alternatively, application 104 or another component may automatically detect a problem with the query and issue a query cancel command Query canceller 402 may be running in a database system, such as database system 102, and is configured to receive query cancel commands. The query cancel command may be an "alter system cancel session '<connection_id>'" or an "alter system disconnect session '<connection_id>'" query cancel command, which indicates that a query with an identifier of "connection_id" should be cancelled.

Query canceller 402 then determines threads 110 that are running the query. To determine threads 110 that are running the user query, query canceller 402 may match a query execution identifier (e.g., a connection id) that may be stored in thread local storage for the query and attempt to determine threads 110 that are executing a query that includes the query execution identifier. Accordingly, query canceller 402 may determine one or more threads 110 that may be executing the query. Query canceller 402 then sends a signal for each thread 110. Note that the query can be executed over one more threads and each thread may include a signal handler. In parallel, a query can be executed with a main thread and multiple job threads. The main thread may aggregate the results from the job threads.

Signal handler 108 throws an exception for each thread 110 that are executing the query. For example, thread 110 on database system 102 may have been executing a query from application 104 that may be taking an abnormally long time. When thread 110 receives the exception, thread 110 cancels the execution of the query.

When threads 110 cancel the query, thread 110 may raise an error, such as "query cancelled" by the throwing of the exception. A main thread 110 may then confirm the query has been cancelled to query canceller 402. Query canceller 402 may then perform an action with respect to thread 110, such as causing thread 110 to exit. Or, query canceller 402 may resume execution of thread 110 to perform another query if an issue associated with the query has been resolved. Also, query canceller 402 may collect information regarding the query being executed.

Figure 5:
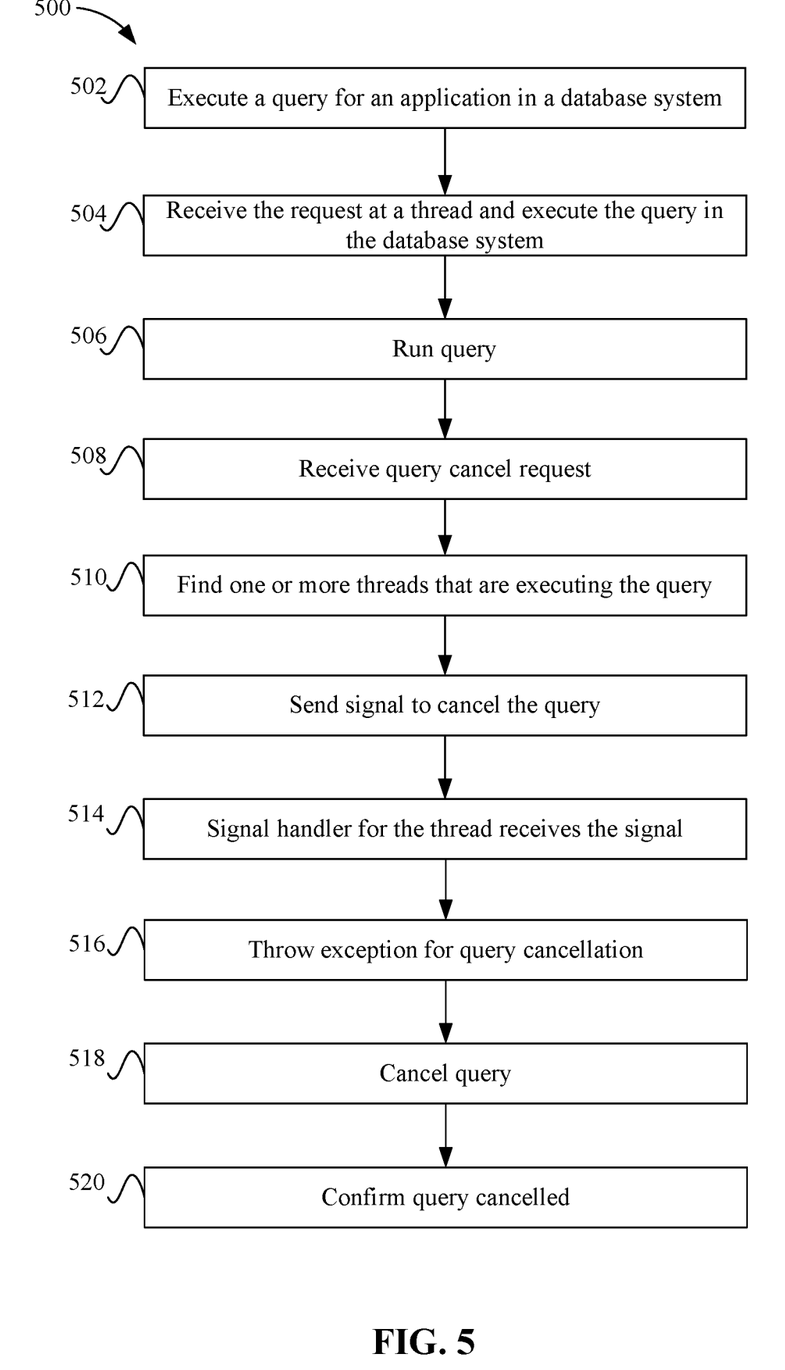
FIG. 5 depicts a simplified flowchart of a method for cancelling a query according to some embodiments.

FIG. 5 depicts a simplified flowchart 500 of a method for cancelling a query according to some embodiments. At 502, database system process 106 executes a query for application 104 in database system 102. At 504, thread 110 receives the request and executes the query in database system 406. For example, thread 110 may be executing a structured query language (SQL) query in database system 406. At 506, the query runs in database system 406 for an indeterminate amount of time and may run over one or more threads 110.

At 508, query canceller 402 receives a query cancel request. For example, an administrator may determine that the query has been running for an amount of time that is considered abnormal and issues a query cancel request. At 510, query canceller 402 finds one or more threads 110 that are executing the query. Then, at 512, query canceller 402 sends a signal to cancel the query to the target threads. Kernel 206 may receive the signal and call a signal handler 108 on the thread. Then, at 514, a signal handler 108 corresponding to each thread receives the signal and may perform any jobs to process the query cancellation. Based on receiving the signal, at 516, signal handler 108 throws an exception to cancel the query. At 518, thread 110 cancels the query, and at 520, confirms the query has been cancelled.

Figure 6:
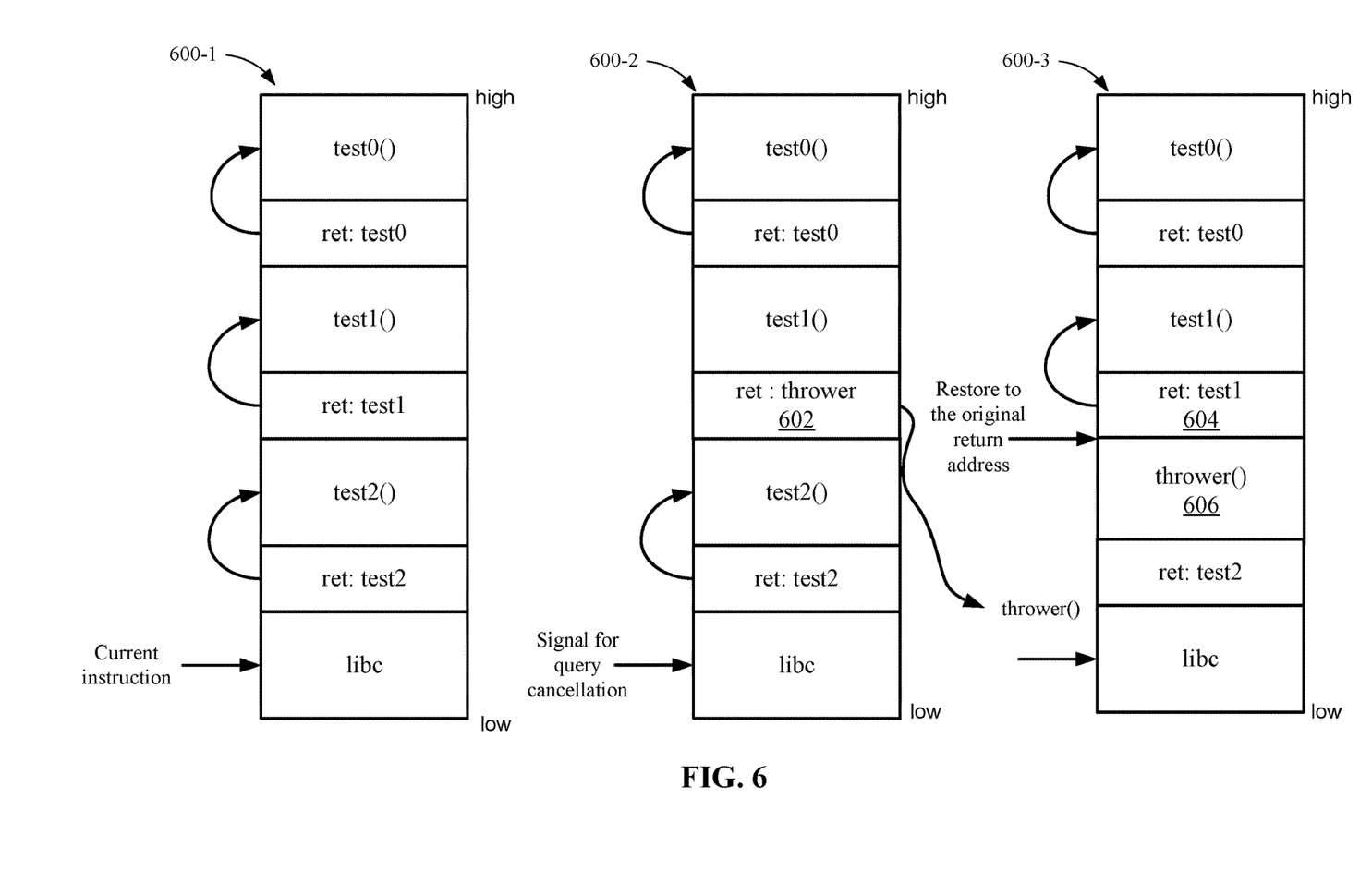
FIG. 6 depicts an example of deferring the throwing of the exception according to some embodiments.

In some instances, there may be no landing pad for the exception. That is, when an exception is thrown, an address space is needed to receive the exception and then execute the exception. When there is no landing pad, the throwing of the exception may be deferred. FIG. 6 depicts an example of deferring the throwing of the exception according to some embodiments. Call stacks 600-1 to 600-3 for database system process 106 are shown at different times. The call stack may store information about the active subroutines of application 104. Functions may be included in the call stack, such as a function "test0( )", "test1( )", "test2( )" and "libc". A return from the function "test1( )" is also included as "ret: test0". Additionally, a return from the function "test2( )" is "ret: test1" and a return from the function "libc" is "ret: test2" In some examples, a current instruction in call stack 600-1 of has no landing pad, such as LIBC, which may be a standard instruction from a C library of functions that may be called. The functions "test0( )", "test1( )" and "test2( )" have their own land pads, respectively, so these are potentially exception-throwable functions. This means these functions do not need deferred throwing functionality and can throw exception immediately in signal handler 108.

In call stack 600-2, at 602, signal handler 108 changes the return address "ret: test1" to the start address of the exception thrower function "thrower( )" for deferred throwing of the exception. The function "thrower( )" is executed when function "test2( )" is returned and allows the exception to be thrown. The function "test2( )" is a last exception-throwable function in the call stack and the function "thrower( )" is a function to throw query-cancellable exception.

Before throwing the exception, the "thrower( )" function restores the original return address in call stack 600-3. For example, at 606, "ret: thrower" is restored to the original return address "ret: test1". Also, at 606, the function "thrower( )" has been inserted into the call stack.

Crash Processing

Figure 7:
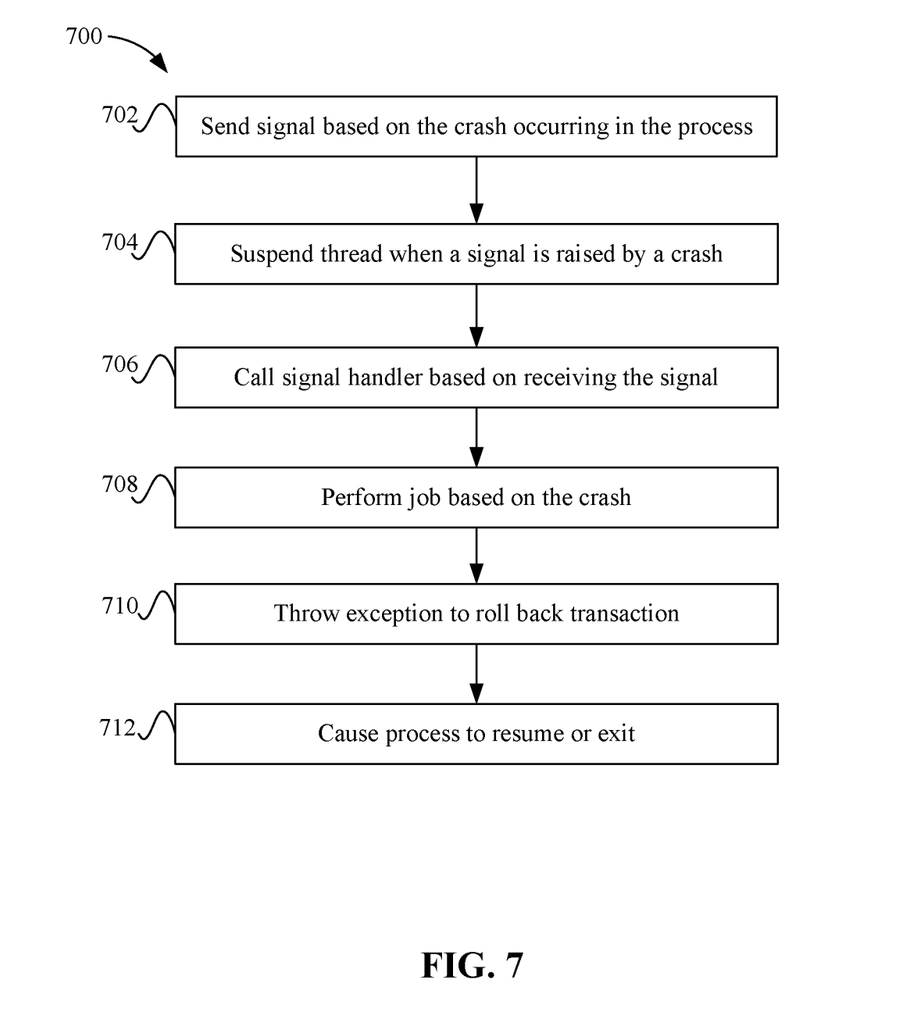
FIG. 7 depicts a simplified flowchart of a method for processing crashes according to some embodiments.

Throwing the exception may also be used to process crashes that occur. FIG. 7 depicts a simplified flowchart 700 of a method for processing crashes according to some embodiments. The crash processing may be performed on database system 102, but other computing systems may be used, such as general processing environments that experience crashes. At 702, kernel 206 sends a signal based on the crash occurring in the process. The signal may be a signal such as signals that represent faults such as a SIGSEGV, SIGFPE, SIGBUG, SIGILL, etc. signals. These signals indicate errors that are encountered, such as a fatal arithmetic error, an invalid memory accessed, an invalid program image, or a virus threat. At 704, when a crash occurs, kernel 206 may suspend thread 110 for database system process 106

At 706, kernel 206 calls signal handler 108 based on receiving the signal. At 708, signal handler 108 may perform a job based on the crash. For example, the job may include retrieving information for the crash and storing it in a log file.

At 710, signal handler 108 may then throw an exception to roll back the transaction. When thread 110 receives the exception, thread 110 may roll back a transaction that was associated with the signal. For example, a function that caused the SIGSEGV, SIGFPE, SIGBUG, SIGILL, etc. may be rolled back. Rolling back the transaction may unwind subroutines that are stored in a call stack of thread 110. The call stack is a data structure that stores information about the active subroutines of application 104. The call stack keeps track of the point to which the active subroutine should return control when it finishes executing. Unwinding the call stack that may cause some subroutines to return from execution using the return address.

After unwinding the call stack for the transaction, at 712, signal handler 108 may cause database system process 106 to resume or exit. For example, if the crash is recovered from and resolved, then signal handler 108 may cause database system process 106 to resume. If the crash is not resolved, signal handler 108 may cause database system process 106 to exit.

Conclusion

Accordingly, signal handler 108 can throw an exception that can perform actions such as handling a crash and cancelling a query. When canceling the query, the exception may cancel the query, which does not require including branches in software code of the database system need to be added to check for the query cancel flag. Additionally, for the crash, the exception may be used to perform jobs for the crash and unwind the transaction in the call stack for the crash. This may allow other components of application 104 that are executing to continue to execute. Further, a job may be performed when the crash is detected, which may not have been possible previously when the crash caused the entire application to stop operating.

System

Figure 8:
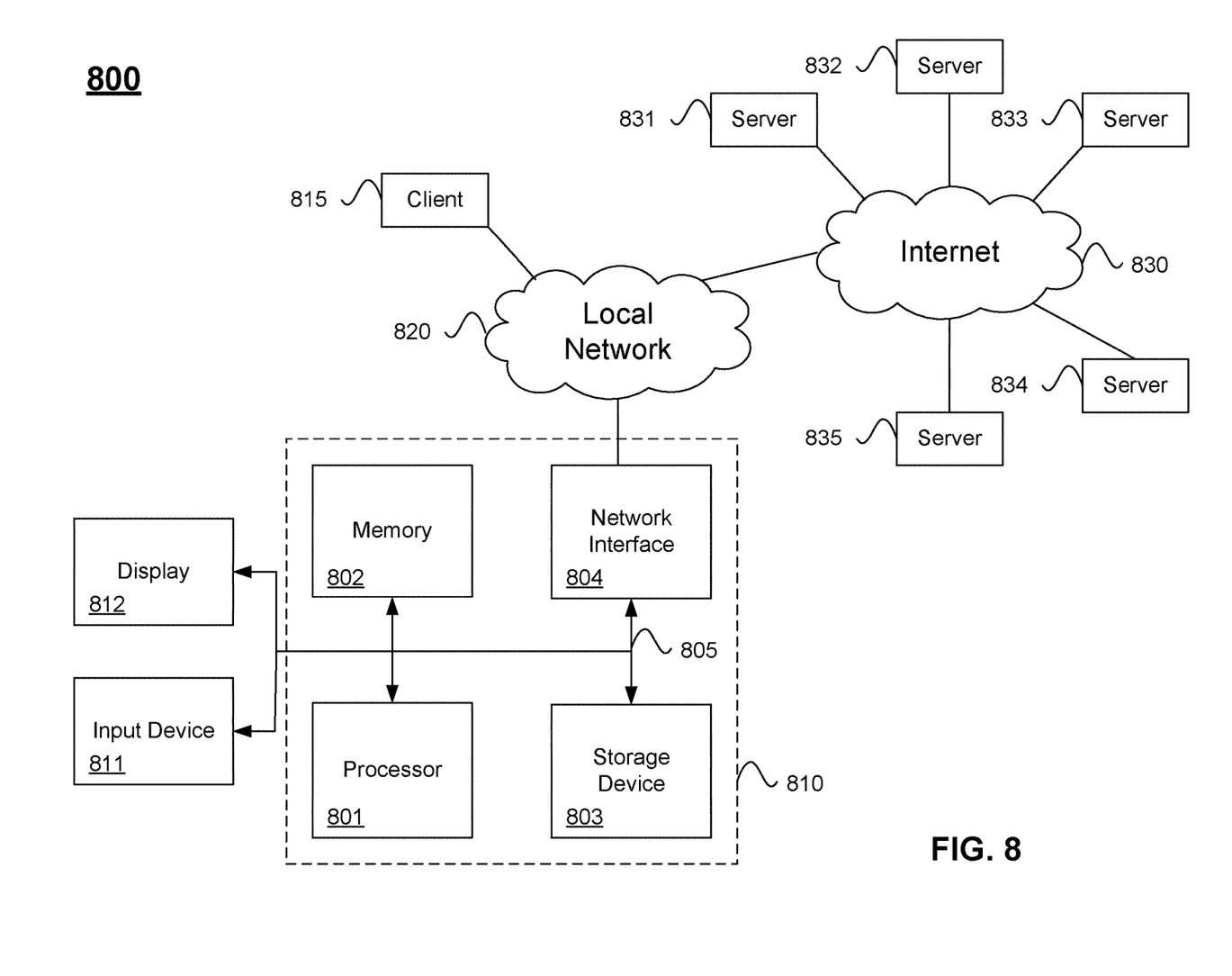
FIG. 8 illustrates hardware of a special purpose computing machine configured with a signal handler according to one embodiment.

FIG. 8 illustrates hardware of a special purpose computing machine configured with signal handler 108 according to one embodiment. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable storage mediums Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information through the network interface 804 across a local network 820, an Intranet, or the Internet 830. In the Internet example, software components or services may reside on multiple different computer systems 810, clients 815, or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for canceling a query, the method comprising:
   detecting, by a computing device, a cancelation of a query for an application that is running, wherein the query is being performed on a database system;
   processing, by the computing device, the cancellation to determine one or more threads associated with the query;
   sending, by the computing device, a signal to the one or more threads that are associated with the process to suspend the one or more threads;
   calling, by the computing device, one or more signal handlers for the one or more threads;
   deferring throwing, by the computing device, an exception by the one or more signal handlers to cancel the query, wherein the exception causes the query to be canceled and there is no landing pad for the exception, wherein deferring the throwing of the exception comprises:
changing a return address of a first function in a call stack to a start address of a second function to throw the exception;
detecting a crash;
in response to detecting the crash, unwinding a transaction in the call stack; and
upon throwing the exception, restoring an original return address of the first function to the call stack,
wherein throwing the exception does not require code to check for a query cancel flag to cancel the query.

2. The method of claim 1, further comprising:
installing the one or more signal handlers for the signal.

3. The method of claim 2, wherein the one or more signal handlers are specific to the signal.

4. The method of claim 1, further comprising;
suspending execution of the one or more threads associated with the query.

5. The method of claim 1, further comprising:
resuming execution of the process upon canceling the query.

6. The method of claim 1, further comprising:
performing a job upon receiving the signal at the one or more signal handlers.

7. The method of claim 1, further comprising:
determining a thread identifier for the cancelation of the query; and
determining a thread that is executing the query based on the thread identifier.

8. The method of claim 7, wherein the exception is thrown on the one or more threads.

9. The method of claim 1, further comprising:
receiving information from the one or more threads indicating that the query has been canceled.

10. A non-transitory computer-readable storage medium containing instructions, that when executed, control a computer system to be operable for:
detecting a cancelation of a query for an application that is running, wherein the query is being performed on a database system;
processing the cancellation to determine one or more threads associated with the query;
sending a signal to the one or more threads that are associated with the process to suspend the one or more threads;
calling one or more signal handlers for the one or more threads;
deferring throwing an exception by the one or more signal handlers to cancel the query, wherein the exception causes the query to be canceled and there is no landing pad for the exception, wherein deferring the throwing of the exception comprises:
changing a return address of a first function in a call stack to a start address of a second function to throw the exception;
detecting a crash;
in response to detecting the crash, unwinding a transaction in the call stack; and
upon throwing the exception, restoring an original return address of the first function to the call stack,
wherein throwing the exception does not require code to check for a query cancel flag to cancel the query.

11. The non-transitory computer-readable storage medium of claim 10, further operable for:
suspending execution of the one or more threads associated with the query.

12. The non-transitory computer-readable storage medium of claim 10, further operable for:
determining a thread identifier for the cancelation of the query; and
determining the thread that is executing the query based on the thread identifier.

13. An apparatus comprising:
one or more computer processors; and
a non-transitory computer-readable storage medium comprising instructions, that when executed, control the one or more computer processors to be operable for:
detecting a cancelation of a query for an application that is running, wherein the query is being performed on a database system;
processing the cancellation to determine one or more threads associated with the query;
sending a signal to the one or more threads that are associated with the process to suspend the one or more threads;
calling one or more signal handlers for the one or more threads;
deferring throwing an exception by the one or more signal handlers to cancel the query, wherein the exception causes the query to be canceled and there is no landing pad for the exception, wherein deferring the throwing of the exception comprises:
changing a return address of a first function in a call stack to a start address of a second function to throw the exception;
detecting a crash;
in response to detecting the crash, unwinding a transaction in the call stack; and
upon throwing the exception, restoring an original return address of the first function to the call stack,
wherein throwing the exception does not require code to check for a query cancel flag to cancel the query.

14. The apparatus of claim 13, further operable for:
suspending execution of the one or more threads associated with the query.

15. The apparatus of claim 13, further operable for:
determining a thread identifier for the cancelation of the query; and
determining the thread that is executing the query based on the thread identifier.

16. The apparatus of claim 13, wherein the one or more signal handlers are specific to the signal.

* * * * *